Dec. 1, 1942.　　　　J. C. DEESE　　　　2,303,827
TRAILER CONSTRUCTION
Filed July 16, 1941　　　　2 Sheets-Sheet 1
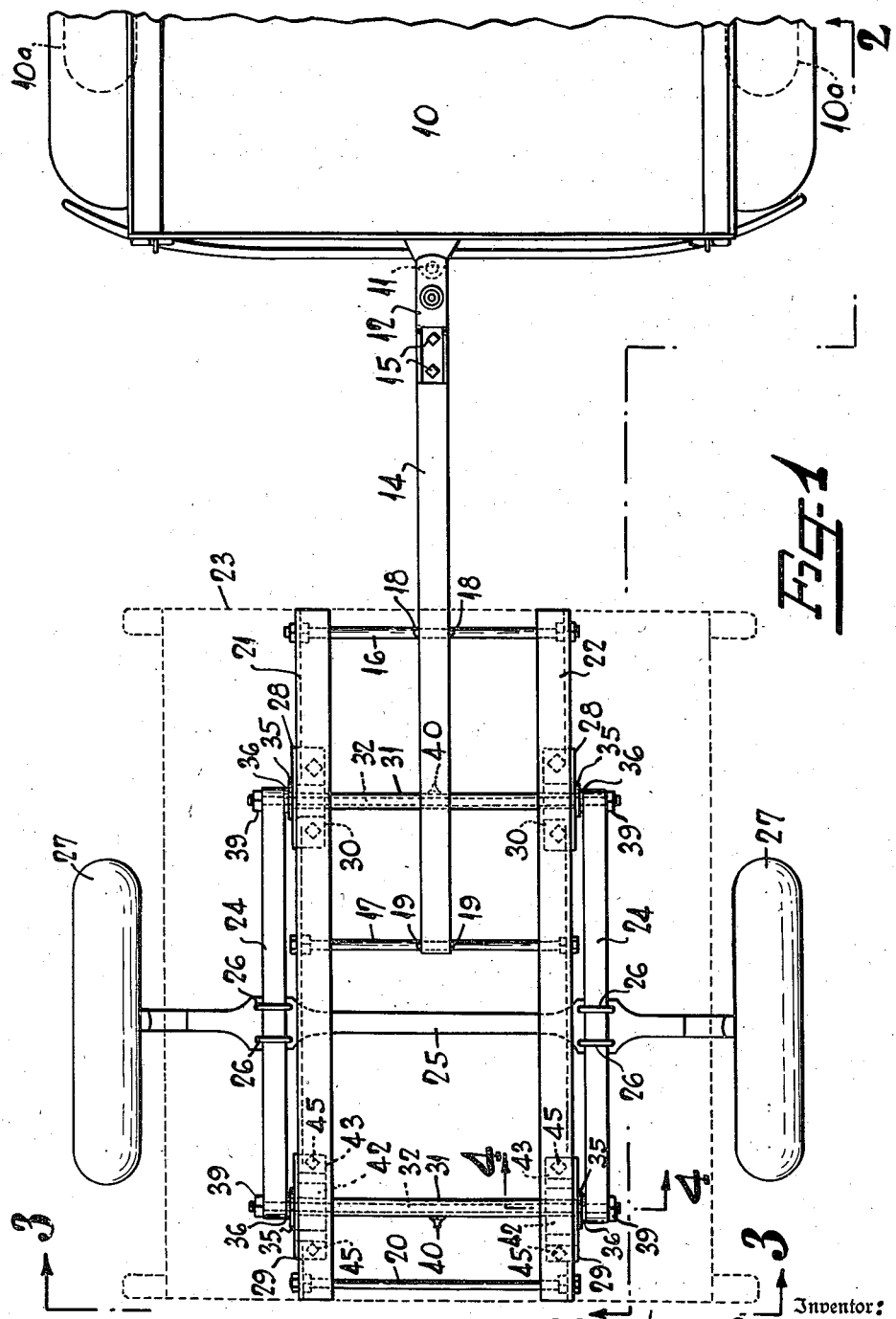

Dec. 1, 1942.    J. C. DEESE    2,303,827
TRAILER CONSTRUCTION
Filed July 16, 1941    2 Sheets-Sheet 2
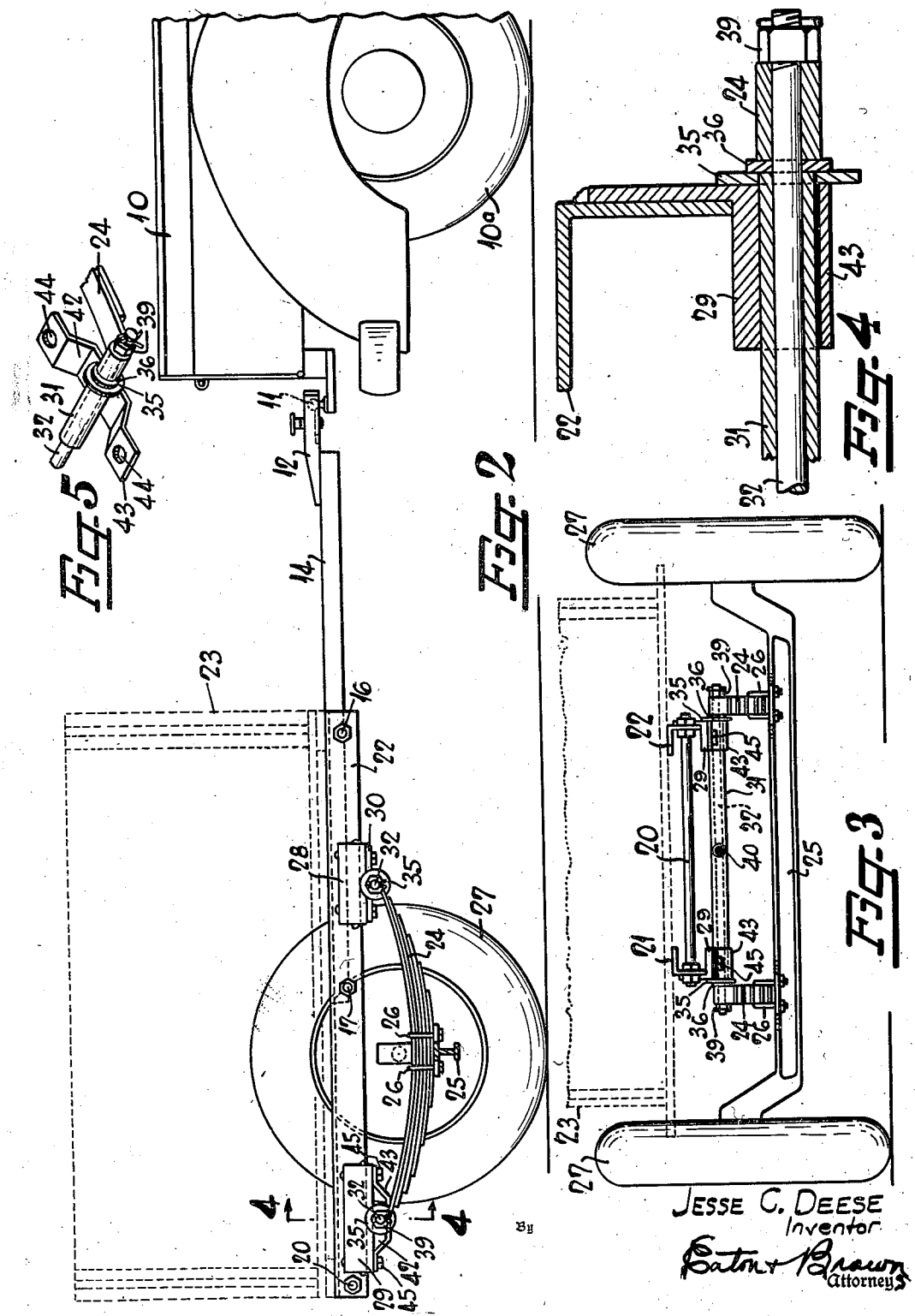
Jesse C. Deese
Inventor
Eaton + Brown
Attorneys Patented Dec. 1, 1942

2,303,827

UNITED STATES PATENT OFFICE 2,303,827

TRAILER CONSTRUCTION

Jesse C. Deese, Charlotte, N. C.

Application July 16, 1941, Serial No. 402,650

1 Claim. (Cl. 280—124)

This invention relates to an automotive trailer and more especially to one equipped with an improved spring hanger designed to eliminate side sway. Spring hangers of conventional trailers are usually such that considerable side sway is permitted, resulting in the wheels of the trailer not properly following or "tracking" the wheels of the tractor when in motion. Very often this side sway results from loose connections between the ends of the springs and the frame of the trailer. Also the lack of sufficiently rigid means for tying the ends of the springs together to cause them to act in unison, results in much side sway and improper tracking. One form of connection between the springs and the trailer body comprises short links having one end pivotally secured to the rear end of the leaf spring and the other end pivotally secured to the trailer body. Play at the pivot points and the leverage of the links permit side sway of the trailer body.

It is, therefore, an object of this invention to provide a trailer having an improved spring hanger designed especially to overcome the above-named difficulties. In the specific embodiment of the invention, a pair of supporting springs are secured intermediate the ends thereof to a wheeled axle. One end of the pair of springs is pivoted at fixed points to the trailer frame and the other end of the pair is connected by a transverse shaft which, in turn, slidably supports the frame. In other words, the free ends of the springs are tied together and slidably attached to the frame in such a manner that a minimum amount of lateral movement of the frame will be permitted while the truck and trailer are in motion.

Some of the objects of the invention having been stated, other objects will appear as the description proceeds when taken in connection with the accompanying drawings, in which Figure 1 is a plan view illustrating the framework of my improved trailer as it appears when attached to the rear portion of an automotive vehicle such as a tractor or truck;

Figure 2 is a vertical longitudinal sectional view taken along the line 2—2 in Figure 1;

Figure 3 is a rear elevation of the trailer and taken along the line 3—3 in Figure 1;

Figure 4 is an enlarged sectional detail view taken along the lines 4—4 in Figures 1 and 2;

Figure 5 is an isometric detail view showing a typical slidable mounting for one end of the pair of springs.

Referring more particularly to the drawings, the numeral 10 denotes a tractor or truck of a conventional type which has attached to the rear portion thereof a suitable ball 11. This ball fits into a socket within a bracket 12, said bracket being secured to the leading end of a tongue 14 by any suitable means such as bolts 15. The trailing end of the tongue 14 is secured to the intermediate portion of traverse bars or rods 16 and 17 by any suitable means such as welding and the like as at 18 and 19 respectively. Bars 16 and 17 cooperate with a third transverse bar 20 for holding suitable side frames or angle irons 21 and 22 in spaced relation to each other. Upon the angle irons 21 and 22 is mounted a conventional body 23, which is shown in dotted lines in the present embodiment of the invention.

As a supporting means for the frame members 21 and 22, and the body 23, suitable leaf springs 24 are provided, there being a leaf spring disposed adjacent each of the angle members 21 and 22. Each of the springs is secured substantially midway of the ends thereof to an axle 25 by any suitable means such as U-bolts 26, said axle having rotatably mounted on each end thereof a suitable wheel 27, preferably of the same gauge as that of the wheels 10a of the tractor or truck.

In order to properly attach the free ends of the springs 24 to the bottom side of the angle irons 21 and 22, suitable angle brackets 28 and 29 are provided, the brackets 28 being disposed forwardly of the axle 25 and the brackets 29 being disposed rearwardly. Each of these brackets are secured to the members 21 and 22 by any suitable means such as welding or the like. An outstanding in-turned leg of each forwardly disposed bracket 28 supports a stationary bearing 30 which, in turn, supports the ends of a suitable pipe sleeve 31 in which a rod or shaft 32 is mounted.

It is seen in Figure 4 that the end of pipe 31 extends slightly beyond the outer vertical face of bracket 29 and that a washer 35 is mounted therearound. The shaft 32 extends considerably farther beyond the vertical face of the bracket 29 and has a suitable washer 36 mounted therearound, one face of said washer being flush with the end of pipe 31 and serving as a grease retainer. That portion of the shaft 32 which projects beyond the washer 36 has the end of spring 24 pressed thereon, and the end of this spring is held upon the projecting end of the shaft by any suitable means such as a nut 39. Therefore, as the ends of springs 24 move up and down the shaft 32 is oscillated a slight amount on account of the press fit between the ends of the springs 24 and the shaft.

It is seen by referring to Figures 1 and 3 that a suitable lubrication fitting 40 is provided on each pipe sleeve 31 so that the contacting surfaces between the inner portion of the sleeve and the periphery of the shaft 32 may be lubricated.

Especial attention is called to the fact that the connection between the remote ends of the pair of springs 24 is identical insofar as the members 31, 32, 35, 36, 37 and 39 are concerned. However, it should be noted that the right-hand ends of the springs 24 in Figure 1 are pivoted in a stationary position at all times in the brackets 30. The left-hand ends of the pair of springs 24, however, are not held in a stationary position, as will be noted by observing Figures 2 and 5. It is here seen that the exterior of the pipe or sleeve 31 is adapted to slide in suitable slots 42, said slots being formed by suitable strap members 43 which are properly bent and secured to the bottom sides of brackets 29. The securing means for the straps 43 comprise bolts 45, said bolts penetrating holes 44 in the strap members. By providing the slots 42, in which one of the pipes 31 is adapted to slide, it is impossible for one spring 24 to be depressed without affecting the other, and therefore the springs work in unison insofar as carrying the load is concerned. Also by providing a structure as shown and described a very close fitting connection may be obtained between the sliding ends of the springs and the framework of the trailer; consequently, side sway of the body of the truck will be reduced to a minimum.

In the drawings and specification, there has been set forth a preferred embodiment of the invention, and although specific terms are employed, they are used in a generic and descriptive sense only and not for purposes of limitation, the scope of the invention being set forth in the following claim.

I claim:

In a vehicle having a frame provided with a pair of longitudinally disposed spaced side members, defining the outside lower edges of the frame, and a transverse axle disposed below the frame and having wheels on each end, a leaf spring on each side of the frame and being outside of a vertical plane defining the side of the frame and extending longitudinally thereof, each spring having its central portion secured to the axle, each end of said springs having a transverse hole therethrough, a shaft for each set of spring ends having its ends occupying a pressed fit in said holes and extending transversely beneath the frame the entire width of the frame and below said side members from one spring to the other, a rigid metallic sleeve mounted for rotation on each shaft and extending from one spring end to the other, at least one end of each of said shafts having a nut threadably secured thereon whereby the ends of the springs can be pressed against the ends of said sleeves, means for fixedly securing one of the sleeves to the lower surface of the side members, and means for mounting the other sleeve in the side members for sliding movement longitudinally of the frame.

JESSE C. DEESE.